Figure 12:
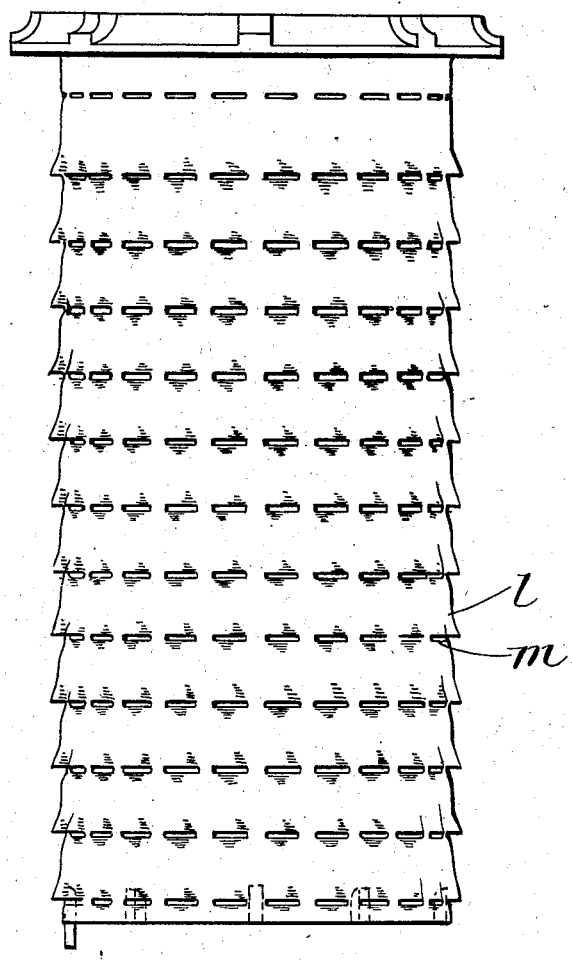

No. 726,237. PATENTED APR. 28, 1903.
O. ANDERSON.
CENTRIFUGAL CREAM SEPARATOR.
APPLICATION FILED JUNE 5, 1901.
NO MODEL.
4 SHEETS—SHEET 1.
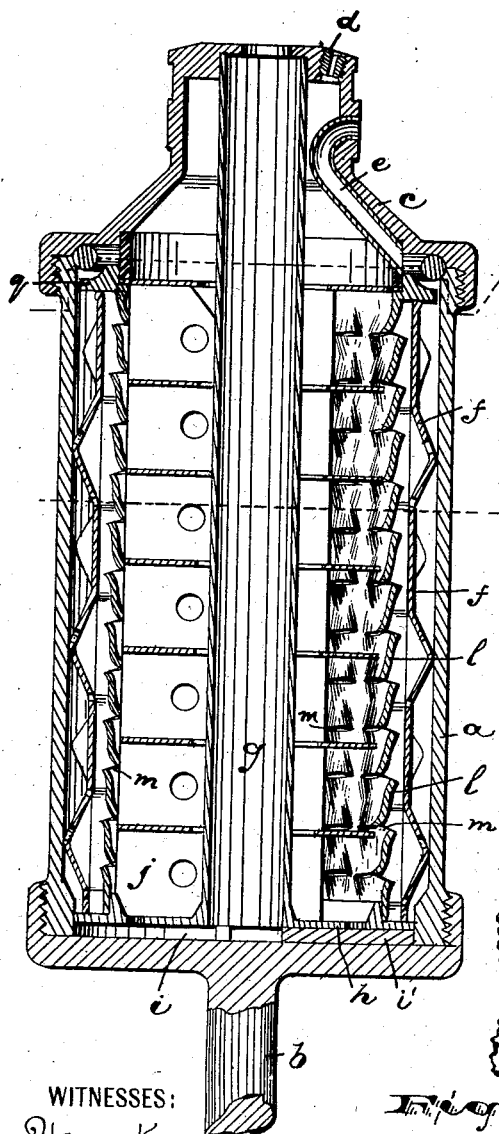
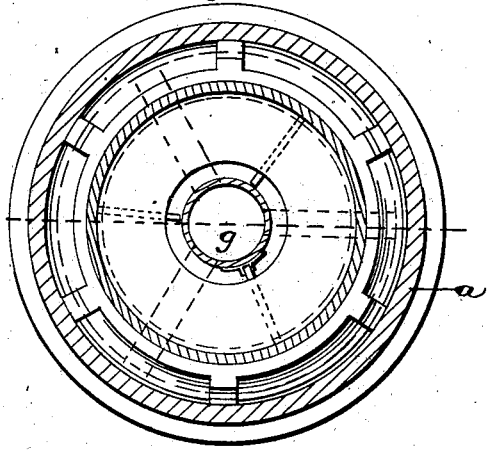
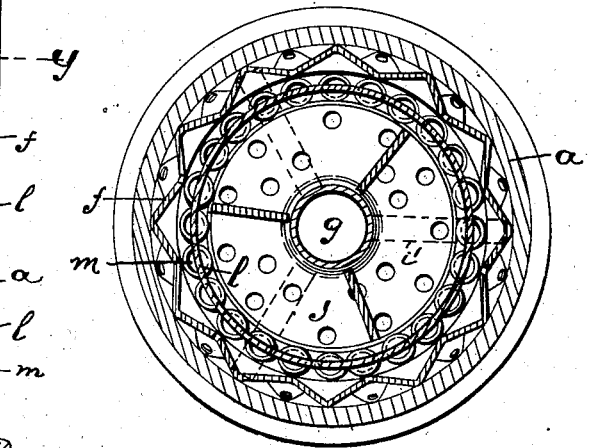
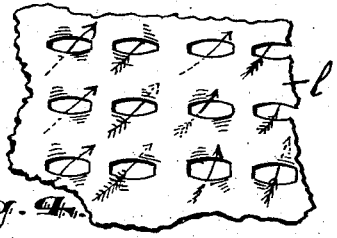
WITNESSES:
Henry Krug
Russell M. Everett
INVENTOR:
Oscar Anderson,
BY
Drake & Co.
ATTORNEYS No. 726,237. PATENTED APR. 28, 1903.
O. ANDERSON.
CENTRIFUGAL CREAM SEPARATOR.
APPLICATION FILED JUNE 5, 1901.
NO MODEL. 4 SHEETS—SHEET 2.
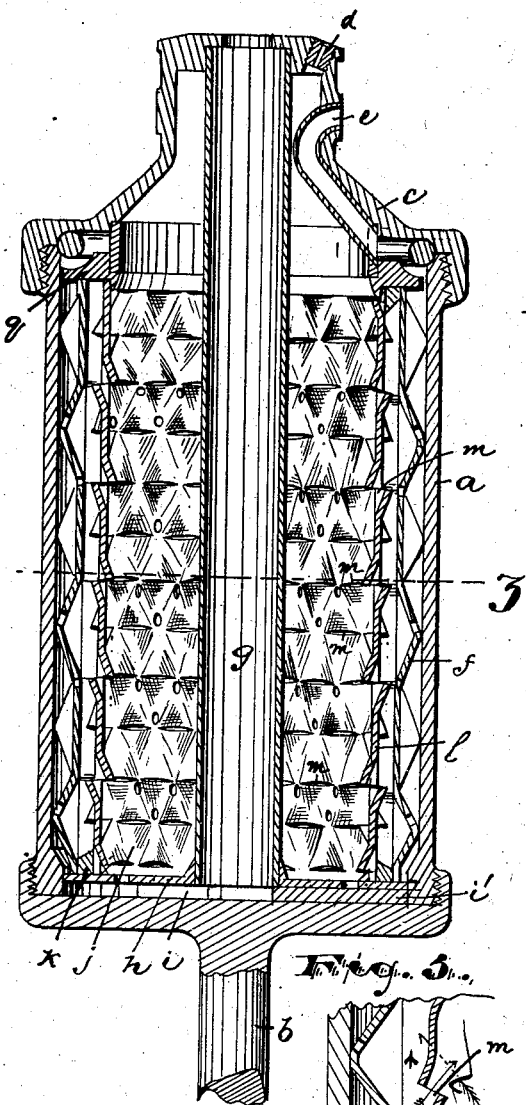
Fig. 5.
Fig. 8.
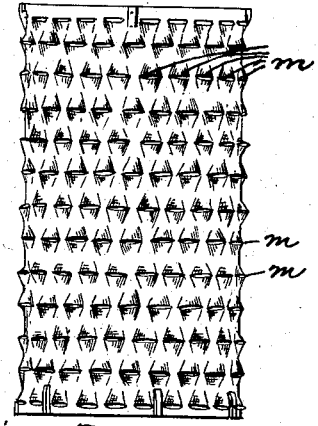
Fig. 6.
Fig. 7.
WITNESSES:
Henry Krug
Russell M. Everett
INVENTOR:
Oscar Anderson,
BY
Baker & Co.
ATTORNEYS.

No. 726,237. PATENTED APR. 28, 1903.
O. ANDERSON.
CENTRIFUGAL CREAM SEPARATOR.
APPLICATION FILED JUNE 5, 1901.
NO MODEL. 4 SHEETS—SHEET 3.
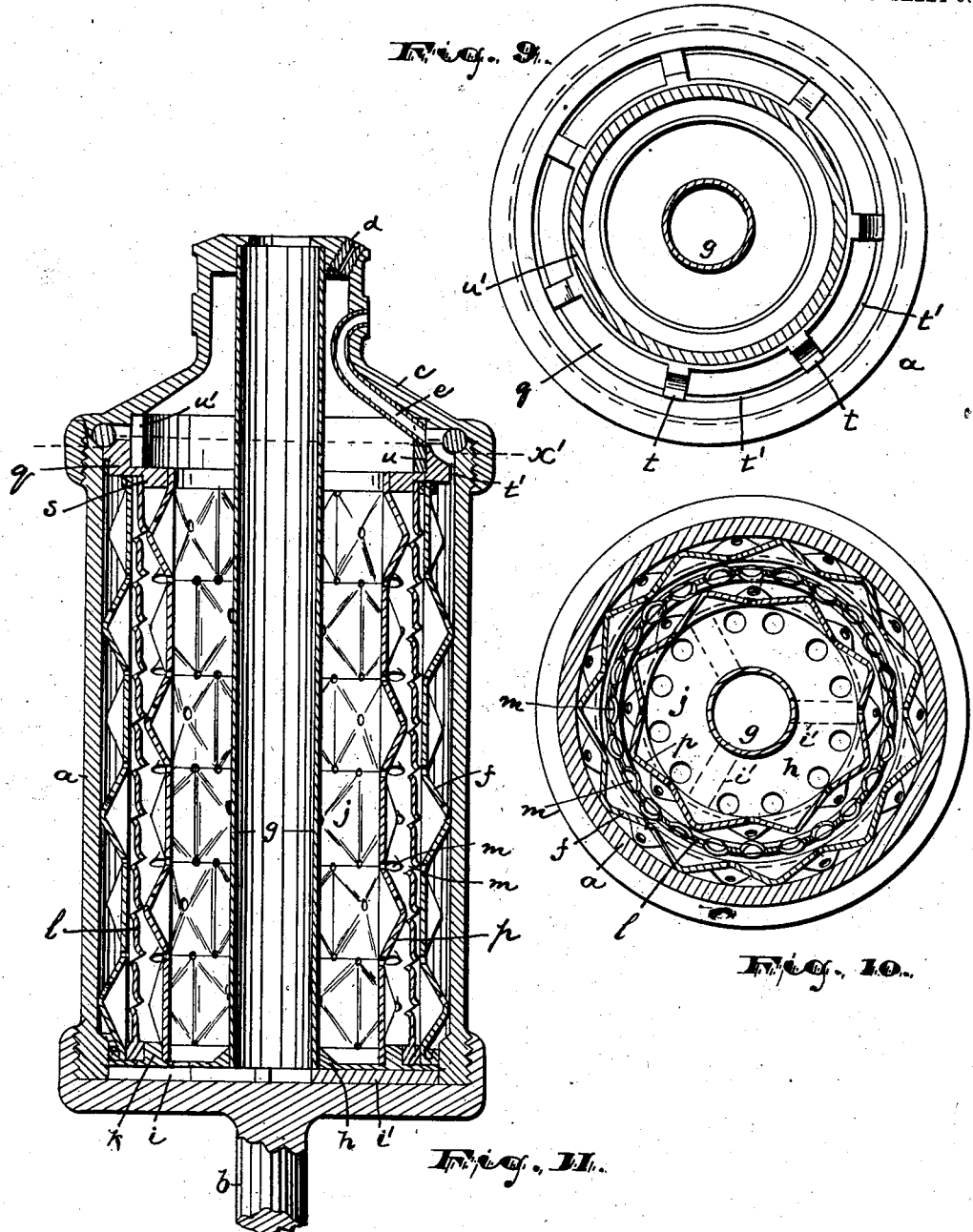
WITNESSES:
Henry Krug
Russell M. Everett
INVENTOR:
Oscar Anderson,
BY
Drake G.
ATTORNEYS.

No. 726,237. PATENTED APR. 28, 1903.
O. ANDERSON.
CENTRIFUGAL CREAM SEPARATOR.
APPLICATION FILED JUNE 5, 1901.
NO MODEL. 4 SHEETS—SHEET 4.

WITNESSES: INVENTOR,
Oscar Anderson,
BY
ATTORNEYS.

UNITED STATES PATENT OFFICE.

OSCAR ANDERSON, OF KEARNY, NEW JERSEY, ASSIGNOR TO NATIONAL DAIRY MACHINE COMPANY, A CORPORATION OF NEW JERSEY.

CENTRIFUGAL CREAM-SEPARATOR.

SPECIFICATION forming part of Letters Patent No. 726,237, dated April 28, 1903.

Application filed June 5, 1901. Serial No. 63,197. (No model.)

*To all whom it may concern:*

Be it known that I, OSCAR ANDERSON, a citizen of the United States, residing at Kearny, in the county of Hudson and State of New Jersey, have invented certain new and useful Improvements in Centrifugal Cream-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in that class of centrifugal creamers represented by the one shown in my prior patent, No. 576,994, dated February 16, 1897, the objects of the present improvements being to secure a more perfect separation of the cream from the milk, to secure a greater efficiency in separation, and to increase the capacity of the bowl, whereby a bowl of a given diameter and speed and requiring a given power to produce such speed will be enabled to separate the cream from a greater quantity of milk with a given perfection of separation than heretofore, and to secure other advantages and results, some of which may be referred to hereinafter in connection with the description of the working parts.

The invention consists in the improved centrifugal separator and in the arrangements and combinations of parts of the same, all substantially as will be hereinafter set forth and finally embraced in the clauses of the claim.

Referring to the accompanying drawings, in which like letters of reference indicate corresponding parts in each of the several figures, Figure 1 is a central vertical section of a centrifugal creamer of my improvement, showing a preferred construction. Fig. 2 is a section taken at line $x$ of Fig. 1. Fig. 3 is a section taken at line $y$ of the same figure; and Fig. 4 is a detail elevation, on an enlarged scale, of a portion of a cylinder adapted to be inserted within the collecting-cylinder for producing within said collecting-cylinder oppositely-inclined eddies. Fig. 5 is another vertical section of my improved separator, showing another detail construction of the inner eddy-producing cylinder. Fig. 6 is a section of the same at line $z$. Fig. 7 is a detail elevation of the said inner cylinder of the latter above-mentioned construction on a reduced scale; and Fig. 8 is a detail section, on a large scale, to show certain opposite eddies within the collecting-cylinder. Fig. 9 is a section on line $x'$. Fig. 10 is a section on line $x^2$, and Fig. 11 is a central vertical section of a preferred construction of my improved separator. Fig. 12 is a detail side elevation of a certain eddy-forming cylinder complete.

In said drawings, $a$ indicates a bowl mounted upon a rotary shaft $b$ and provided with a cover $c$, having a cream-screw $d$ and a blue-milk-exit tube $e$, all of any suitable construction and arrangement.

$f$ is a collecting-cylinder having protuberances and perforations and serving to collect the cream, all substantially as described in my patent above referred to.

At the center of the bowl is a milk-tube $g$, extending from the top or cover $c$ downward to a bottom plate $h$ therein, through which tube the supply of new milk is fed to narrow horizontal passages $i$ at the said bottom of the bowl between low partitions $i'$, where the new milk is spread out horizontally preliminary to being fed upward into the separating-chamber $j$ above the said bottom plate or partition, said bottom plate being perforated, as shown in Figs. 1, 3, 6, and 10, to permit a free up movement of the said milk into the said separating-chamber above the plate. The said bottom plate $h$, near the periphery thereof, provides a seat for the collecting-cylinder $f$, and in from said seat for said cylinder $f$ said plate $h$ is furnished on the upper side with an annular rib or groove $k$, the said rib being adapted to fit an eddy-forming cylinder $l$, arranged within and concentric with the said collecting-cylinder. The said eddy-forming cylinder $l$ comprises, preferably, a single sheet of cylindrically-bent metal, the opposite edges of which are united by rivets, solder, or the like, the sheet of metal being perforated with slots $m$ greatly exceeding numerically the perforations in the cream-collecting partition. Adjacent to each of said slots $m$ the sheet metal of the inner eddy-forming cylinder $l$ is bent inward and outward, so as to form inclined walls which are near the slots substantially parallel with one another, so as to give an inclination to the current or eddy of fluid passing therethrough, the inclination being directed toward and from the axis of rotation of the bowl in opposite directions, as indicated in Figs. 4 and 8, the horizontal slots $m$ not only exceeding in number the number of perforations in the collecting-cylinder lying next outside of the eddy-producing cylinder, but also exceed the same in flow capacity, so that a greater amount of fluid will be permitted to flow through said slots than can flow through the perforations of the collecting-cylinder, and said slots $m$ are preferably disposed horizontally, so that the fluid will be delivered therefrom in sheet-like eddies, which are directed by the inclined parallel walls across the normal upward-flow lines of movement.

In the preferred construction (shown more clearly in Fig. 4) the slots and bent walls adjacent thereto are formed in uniform vertical series, the alternate series being constructed so that the fluid is directed alternately in one series inwardly and in the next outwardly as it flows upward.

It will be understood that because of the retardation of the fluid within the bowl, due to the friction and forces acting on said fluid, said fluid takes a spiral course in the bowl, as indicated by the arrow in Fig. 4. The alternation in the direction of the walls of the series of slots effects an inward and then outward movement of the fluid as it takes the said spiral upward course, and these inward and then outward movements are so that there is a crossing of eddies, as will be understood upon examination of the arrows in Figs. 4 and 8. This inward-and-outward movement of eddies moving side by side in opposite directions tends to cause what may be termed "slow whirlpools," which tend to bring the cream particles against the surface or surfaces of the collecting cylinder or cylinders.

In the formation of eddies it may be observed that the body of milk is given a back-and-forth movement, the capacity of the slots being materially greater than the perforations of the collecting-cylinders heretofore provided. These latter were regulated in size to permit the inflow of the separated cream and the outflow of blue milk from which the cream had been more or less fully removed. The new eddy-forming partition has its perforations relatively larger than those of the collecting-cylinder, so that the whole body of milk is affected by the back-and-forth movements in opposite directions as the said body of milk slowly moves upward or toward its final outlet. I prefer in connection with this eddy-producing cylinder $l$ to employ a cream-gathering partition $p$ at or near the inside of the eddy-producing partition, as shown in Figs. 10 and 11.

While I produce by my construction back-and-forth currents or eddies, and thus break the straight upward movement of the body of milk, I so arrange or dispose the eddy-producing slots or passages that there is no immediate conflict of such eddies, such as would tend to create a disturbance of the separated particles, the eddies taking a smooth course back and forth, such as will prevent or avoid emulsion. The body of liquid is thus positively brought into contact with the creaming-surfaces of the cream-gathering partitions $f$ and $p$, and as a result I secure a more positive and thorough collection of the cream particles and am enabled without detriment to separation to quicken the flow of the body of milk through the separating-bowl, whereby the capacity of the bowl is increased, as will be understood. The effect of the horizontally-inclined back-and-forth currents extends to a large extent through the outside cream-gathering partition $f$, so that the fluid outside of said outer partition is brought more thoroughly into contact with the outside of the cream-gathering surfaces, whereby the cream is gathered more perfectly on said outer partition. The cylindrical partitions thus described are held in their proper relative positions at the top of the bowl by means of a ring $q$. (Shown in detail in Fig. 9 and in cross-section in Fig. 11.) Said ring on the under side is provided with a shoulder $s$, against which the eddy-producing cylindrical partition is permanently fastened in the preferred construction. At its interior wall it provides a bearing for the inner cream-collecting partition. The outer periphery of the said ring $q$ is provided with radial extensions $t$, Fig. 9, which bear against the inside wall of the bowl, so as to form between said extensions small outflow-passages $t'$ for the blue milk to flow to the blue-milk-outlet tube $e$. On the upper side of said ring is arranged or formed an annular shoulder $u$, within which a ring or flange $u'$, extending down from the cover $c$, may fit, so as to hold said ring $q$ and the partitions with which it is associated in rigid and firm position.

Having thus described the invention, what I claim as new is—

1. The improved cream-separator herein described, comprising a cream-collecting partition having a multiplicity of protuberances and perforations, and an eddy-producing partition, arranged substantially concentric with the collecting-partition and having therein a multiplicity of passages differing from the perforations of the cream-collecting partitions in flowage capacity, substantially as set forth.

2. The improved cream-separator herein described comprising a cream-collecting partition having a multiplicity of protuberances with perforations therethrough and an eddy-producing partition comprising a cylinder having a multiplicity of slots therethrough, each slot having a greater flowage capacity than a perforation of the cream-collecting partition, substantially as set forth.

3. The improved cream-separator in which is combined a cream-collecting partition and a partition having passage-ways therethrough some of which are directed upwardly and others downwardly and adapted to impart to the fluid under separation back-and-forth flowage, whereby the body of milk is brought into contact repeatedly with the cream-collecting partition, substantially as set forth.

4. The improved centrifugal fluid-separator herein described, in which is combined with a cream-collecting partition, of another partition arranged concentric with the first said partition and having a multiplicity of slots, the opposite walls of which lie out of the normal vertical line of the side of the cylinder, and thus give direction to the slot across the radial lines of force thereof, substantially as set forth.

5. The improved cream-separator herein described comprising a rotary bowl, a cream-collecting partition having protuberances and perforations and an eddy-producing partition having slots therethrough, the adjacent walls of each of which are turned, one wall being turned inwardly and the opposite wall outwardly to give a direction to the passage-way across the radial lines of force and a corresponding direction to the fluid passing through said slots, the passage-ways of said slots alternating in direction to effect crossing eddies of the fluid as said fluid gradually flows toward its final exit.

6. In a centrifugal separator the combination with a bowl of a collecting-cylinder and an eddy-forming cylinder arranged inside of said collecting-cylinder and having permanently secured at the top, a ring which projects over the end of said cream-collecting cylinder and against the inside of the bowl, said ring having flow-passages formed between it and said bowl.

7. In a cream-separator, the combination with a bowl, and outer cylinder having protuberances with inclined sides, and perforations at the outer and inner limits of said protuberances, of an inner cylinder having eddy-producing passages directed oppositely across the radial lines of force, the said inner cylinder having a ring permanently secured thereto and projecting across the end of the outer cylinder toward the inside wall of the bowl and said ring having therein flow-passages for the blue milk.

8. In a centrifugal fluid-separator, the combination with a bowl having an inlet and outlet for the fluid, of an inner and an outer cylinder within said bowl, the inner cylinder having a multiplicity of open passages therethrough directed downwardly against the general course of the fluid from its inlet to its outlets of the bowl, substantially as set forth.

9. In a centrifugal fluid-separator, the combination with a bowl having an inlet for the whole fluid and exits for the separate fluids, of a cylinder arranged in said bowl and having a multiplicity of protuberances and perforations and a second cylinder having a multiplicity of horizontally-disposed slots, the longer walls of which are turned from the normal lines of the sides of the said second cylinder to direct the fluid flowing therethrough across the radial lines from the vertical axis of the bowl.

In testimony that I claim the foregoing I have hereunto set my hand this 14th day of May, 1901.

OSCAR ANDERSON.

Witnesses:
CHARLES H. PELL,
C. B. PITNEY.